United States Patent [19]

Hilliard et al.

[11] Patent Number: 5,213,771
[45] Date of Patent: May 25, 1993

[54] GAS INJECTOR FOR HYPOCHLOROUS ACID REACTOR

[75] Inventors: Garland E. Hilliard; James K. Melton; John Shaffer, all of Cleveland, Tenn.

[73] Assignee: Olin Corporation, Cheshire, Conn.

[21] Appl. No.: 264,934

[22] Filed: Oct. 31, 1988

[51] Int. Cl.⁵ .............................................. B01F 3/04
[52] U.S. Cl. ..................................... 422/224; 422/228; 422/232; 422/234; 159/4.01; 159/4.2
[58] Field of Search ............... 422/224, 228, 232, 234; 159/4.01, 4.02, 4.2

[56] References Cited

U.S. PATENT DOCUMENTS

| | | | |
|---|---|---|---|
| 1,403,993 | 1/1922 | Wallace et al. | |
| 1,748,897 | 2/1930 | Oppe | |
| 1,897,729 | 2/1933 | Mac Lachlan | 159/4.2 |
| 2,240,342 | 4/1941 | Muskat et al. | 23/152 |
| 3,113,062 | 12/1963 | Darnell | 159/4.2 |
| 3,578,400 | 5/1971 | Wojtowicz et al. | 23/152 |
| 3,706,599 | 12/1972 | Woodruff et al. | 159/4.2 |
| 3,885,918 | 5/1975 | Isahaya | 422/224 |
| 4,146,578 | 3/1979 | Brennan et al. | 423/473 |
| 4,147,761 | 4/1979 | Wojtowicz et al. | 423/473 |
| 4,187,617 | 2/1980 | Becker, Jr. et al. | 159/4.02 |
| 4,584,000 | 4/1986 | Guest | 159/4.2 |

FOREIGN PATENT DOCUMENTS 755950  8/1956  United Kingdom .............. 159/4.02

*Primary Examiner*—Lynn M. Kummert
*Attorney, Agent, or Firm*—Ralph D'Alessandro

[57] ABSTRACT

An elongated, generally vertically extending cocurrent reactor vessel for the production of hypochlorous acid by the mixing and reaction of a liquid alkali metal hydroxide and a gaseous halogen is provided wherein a nozzle is mounted near the top of the reactor vessel beneath the gas injector to spray the liquid alkali metal hydroxide in droplets so that the halogen gas can be absorbed into the surface of the droplets simultaneously with water evaporation in the vessel. The vessel has a spraying and reaction zone immediately beneath the atomizer and a drying zone beneath the spraying and reaction zone.

17 Claims, 1 Drawing Sheet

GAS INJECTOR FOR HYPOCHLOROUS ACID REACTOR

BACKGROUND OF THE INVENTION

This invention relates generally to a reactor vessel and, more specifically, to a reactor vessel for the production of halogenated acid and, more particularly hypochlorous acid, by the mixing and reaction therein of an alkali metal hydroxide and a gaseous halogen. More specifically, the invention relates to a reactor vessel for the production of a hypohalogenated acid by the mixing and reaction therein of an alkali metal hydroxide having gaseous halogen wherein the halogen gas is injected into the top of the reactor above the nozzle.

Hypochlorous acid is used extensively in the preparation of chlorohydrin and chloramines. Chloroisocyanurates are typical examples. Hypochlorous acid has been produced by several processes or techniques. The use of dilute hypochlorous acid and large quantities of halogen to produce hypohalites, such as sodium hypochlorite, is recent.

One technique employs the process in which chlorine, steam and air are bubbled through an aqueous solution of an alkali earth metal hypochlorite, such as calcium hypochlorite, to remove the resulting hypochlorous acid in vapor form. The hypochlorous acid is then condensed and stored for use. This process, however, produces a large volume of undesirable by-product in the form of calcium chloride.

Another process uses a low concentration of aqueous caustic solution to scrub chlorine gas. However, the solution has an available chlorine content of about only 5% and, because of the chloride ion content, the hypochlorous acid that is formed quickly decomposes, most preferably to chloric acid.

Another related process prepares a solid mixture of alkali metal hypochlorite and alkali metal chloride by reacting chlorine gas with a spray of alkali metal hydroxide, while drying the reactants and product with a gas. Some cooling of the reacting chemicals and the drying gas may be done. The primary products of this process have very limited utility.

A more recent process, which produces hypochlorous acid vapor, sprays aqueous alkali metal hydroxide, in droplet form or as solid alkali metal hydroxide particles, into gaseous chlorine. This approach attempts to utilize droplet sizes to attain the maximum surface to volume ratio possible. Droplets having an average diameter of less than about 1000 microns are employed.

These previous processes, and the apparatus employed to produce these processes, have suffered from not achieving substantially complete reactions between the chlorine and the alkali metal hydroxide. A critical factor in determining the complete reaction is the droplet size of the alkali metal hydroxide. It is also desirable that any hypochlorous acid produced and any water present be readily vaporizable. The salt particles produced as by-products in any process should be dry to facilitate handling. The salt particles should be sized so that they readily separate from the gaseous product mixture of hypochlorous acid. Prior processes have produced oversized alkali metal hydroxide droplets that result in the undesired reaction of hypochlorous acid and the oversized particles to produce significant alkali metal chlorates. These oversized particles then retain excessive moisture so that caking results and the caked masses adhere to the reactor surfaces. The presence of such alkali metal chlorates reflect reduced yields of the desired hypochlorous acid, while increasing the raw material and operating costs.

These problems are solved in the design of the present invention wherein a cocurrent reactor vessel for the production of a halogenated acid, such as hypochlorous acid, is provided in which the mixing and reaction of alkali metal hydroxide and a gaseous halogen occurs.

SUMMARY OF THE INVENTION

It is an object of the present invention to provide a reactor vessel within which a gas phase controlled reaction can occur to produce a hypohalogenated acid.

It is another object of the present invention to provide a reactor vessel in which the halogen gas is injected into the reactor vessel immediately above an atomizer that feeds in a liquid alkali metal hydroxide.

It is still another object of the present invention to provide a reactor vessel in which both a liquid-gas reaction and drying occur to produce a gaseous product and a solid by-product.

It is a feature of the present invention that a halogen infeed annulus or injector is provided to inject substantially pure halogen gas into the reaction vessel in a generally downwardly flowing path directly above the alkali metal hydroxide atomizer.

It is another feature of the present invention that an atomizer is employed to produce small droplets of an alkali metal hydroxide to ensure that undesirable secondary reactions are minimized and that proper drying of the desired particles occurs.

It is still another feature of the present invention that the reactor vessel permits the rapidly sequential events of absorption of gaseous halogen into the droplets of alkali metal hydroxide and water evaporation to occur.

It is yet another feature of the present invention that the atomizer is located near the top of the reactor vessel.

It is yet another feature of the present invention that heated halogen gas is fed into the top of the reactor vessel.

It is an advantage of the present invention that the production of oversized alkali metal hydroxide droplets are avoided and that undesirable secondary reactions are minimized.

It is another advantage of the present invention that manufacturing costs are substantially reduced.

These and other objects, features and advantages are provided in a cocurrent reactor vessel for the production of a hypohalogenated acid, such as hypochlorous acid, from the mixing and reaction of an alkali metal hydroxide and gaseous halogen in the reactor vessel, which is elongated and generally vertically positioned. The atomizer for spraying the alkali metal hydroxide is mounted within the reactor vessel above both the spraying and reaction zone and the drying zone and immediately below a halogen injecting annulus.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

Figure 1:
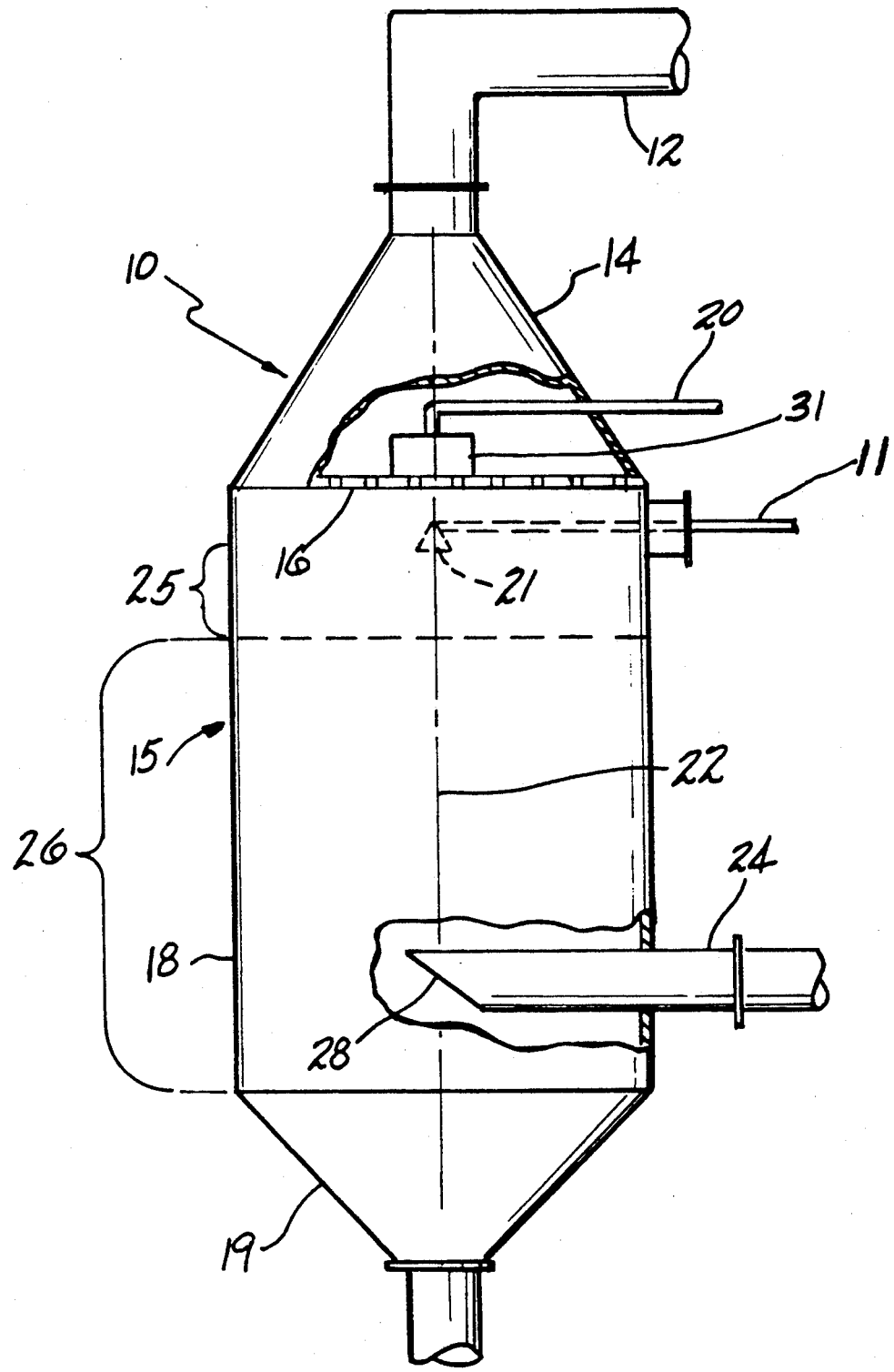
FIG. 1 is a side elevational view of the reactor vessel.

FIG. 1 shows the reactor, indicated generally by the numeral 10, which reacts the liquid alkali metal hydroxide, such as caustic, supplied by feed line 11 with the gaseous halogen, such as chlorine, to produce a solid by-product, such as salt crystals and a gaseous product, such as HOCl. Although the reactor 10 will be discussed in terms of producing hypochlorous acid, it is to be understood that any halogen could be employed to produce a hypohalogenated acid. Typical such hypohalogenated acids are, for example, hypobromous or hypofluorous acid.

In instances where the HOCl is produced, the HOCl is condensed to produce liquid hypochlorous acid. The liquid hypochlorous acid, for example, can be mixed with a lime slurry to produce calcium hypochlorite.

The gaseous halogen, or more specifically as will be discussed in this instance, the gaseous chlorine, along with some chlorine monoxide in the recycle system, is fed into reactor 10 via recycle gas infeed 12 in the reactor top 14. Reactor top 14 is in the shape of an inverted funnel that can be constructed of a suitable corrosion resistant material, such as titanium; coated titanium; an alloy including nickel, chrome, molybdenum, iron and other materials; tantalum; and lined carbon steel or lined fiberglass reinforced plastic.

Reactor vessel 15 underlies reactor top 14 and has a perforated plate 16 at the junction between the reactor top 14 and the central section 18 of vessel 15. The plate 16 is also made of a suitable corrosion resistant material, such as polytetrafluoroethylene or one of the above-mentioned materials with respect to reactor top 14. Plate 16 is a flow director that serves to create a straight cocurrent flow path for the chlorine gas flowing down from the reactor top 14 into the reactor vessel 15. Ethylene chlorotrifluoro-ethylene has also been used as a construction material for reactor vessel 15. Vessel 15, similarly can be made from any suitable corrosion resistant material, such as carbon steel with a liner or coating of a suitable perfluoropolymer, such as that sold under the tradename TEFLON ® PFA.

Reactor vessel 15 has a generally elongated cylindrical central section 18 which tapers to a conically shaped funnel bottom 19 to permit solid alkali metal halide salt, such as NaCl, product to discharge out through a standpipe, not shown, for further processing. Vessel 15 has a caustic feed line 11 that enters through its side and provides the caustic to atomizer 21. Atomizer 21 is mounted along the center line 22 of the vessel 15 about six (06) inches below the top of the central section of vessel 15. Atomizer 21 creates caustic droplets of a desired size between about 50 to 200 microns which are of sufficient size to absorb virtually all of the gaseous chlorine feed while the chlorine and caustic quickly react to produce the gaseous and solid products as shown in the equation:

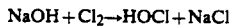

$$NaOH + Cl_2 \rightarrow HOCl + NaCl$$

The reaction occurs at a pH of about 4 to about 6 with a stochiometric ratio of about 30 to 1 chlorine to caustic. The gaseous HOCl is condensed between about 0 to about 10° C. after exiting the reactor to recover a concentrated HOCl solution.

Halogen gas feed line 20 enters through the side of reactor top 14 and feeds into an infeed annulus or injector 31 that is generally cylindrically shaped and open bottomed. Annulus 31 directs pure fresh halogen gas downwardly through the perforated plate 16 directly over the atomizer 21 to ensure a fresh infusion of halogen gas directly into the droplets of alkali metal hydroxide so that the necessary reaction occurs with sufficient halogen present. This is accomplished by concentrating the halogen gas around the atomizer 21. The cross-sectional area of the annulus 31 is designed to match the flow rate of the pure halogen gas fed in through halogen gas feed line 20 with the flow rate of the recycled gases fed in through recycle gas infeed 12. In this particular instance, the halogen gas is chlorine and the alkali metal hydroxide is caustic or sodium hydroxide.

Recycled gases, such as chlorine and chlorine monoxide, are exhausted from the vessel 15 through exhaust duct 24 and are fed back into reactor 10 via a recirculation loop 30, after passing through a heat exchanger 32 to achieve the necessary heat, when combined with the heat of reaction to evaporate the hypohalogenated acid, such as hypochlorous acid, and water phase to leave a dry solid sodium chloride, or salt, by-product. The desired reaction temperature ranges from about 80° to about 100° centigrade. The recycled gases are also used as reactant gases in the production of the hypohalogenated acid.

The recycled gases, for example chlorine and chlorine monoxide, enter the reactor vessel 15 as described previously and disperse outwardly in the inverted funnel reactor top 14. They then pass through the flow directing means or perforated plate 16 to enter the reactor vessel 15 in a generally vertical flow orientation. Fresh halogen gas, for example chlorine, is fed in through chlorine feed line 20 through the reactor top 14 and is directed down over the nozzle or atomizer 21.

Atomizer 21 may be a single fluid atomizer, a two fluid nozzle or a rotary or wheel atomizer, dependent upon the viscosity and density of the alkali metal hydroxide being atomized and the amount of pressure to which the liquid is subjected. Pressure nozzles, pneumatic nozzles or sonic nozzles also may be employed as long as the appropriate sized droplets and spray pattern are obtained. The materials of construction of the atomizer must be capable of withstanding the harshness of the environment within the reactor.

The vessel 15 has an outlet or exhaust duct 24 at the bottom of the drying zone 26 just above the funnel or conically shaped bottom 19 to remove the product gas, the unreacted halogen gas and some by-product into the recirculation loop 30 as previously described. Outlet or exhaust duct 24 exits through the side of vessel 15 generally horizontally and has an inlet 28 that is undercut such that the top overhangs or overlies and covers the bottom to preclude solid alkali metal chloride by-product, for example sodium chloride, from falling directly into it. The preferred shape of the inlet 28 is an undercut ellipsoid.

The vessel 15 has its central section 18 preferably cylindrically shaped, but it could also be polygonal, as appropriate. The cylindrical design has a desired diameter and length. The length extends from the top at the perforated plate 16 to the bottom of the drying zone 26, just above the funnel bottom 19. The dimensions of the length and the diameter can be selected so that the length to diameter ratio, l/d, can range from about 1 to 1 to about 1 to 5.

In operation the halogen gas, for example chlorine, is fed into the reactor 10 through feed line 20 and is directed generally vertically downwardly over atomizer 21 by the gas infeed annulus 31 that serves to contain the halogen gas and direct it generally downwardly through the perforated plate 16. Recycled gases are fed in from the recirculation system via gas recycle infeed 12 into the reactor top 14 and are directionalized by perforated plate 16 down into reactor vessel 15. Vessel 15 has an elongated cylindrical section 18 which has a spraying and reaction zone 25 adjacent the top surrounding atomizer 21 and a drying zone 26 therebelow.

The reacted gases exit the reactor 10 through outlet or exhaust duct 24 for processing and recirculation, as appropriate. The solid by-product alkali metal halogen salt, such as sodium chloride, exits the vessel 15 through the conically shaped funnel bottom 19 for processing. Bottom 19 is connected by conventional flanging to connecting pipes (not shown).

The solid by-product alkali metal halogen salt is dried as it passes down through the drying zone 26 The overhanging top portion of exhaust duct 24 prevents substantial quantities of the solid by-product from being drawn out through the undercut ellipsoid inlet 28 with the product HOCl gas and the recycle gases.

While the preferred structure in which the principles of the present invention have been incorporated is shown and described above, it is to be understood that the invention is not to be limited to the particular details thus presented, but, in fact, widely different means may be employed in the practice of the broader aspects of this invention. For example, while being described as an infeed annulus 31, the shape could equally well be polygonal as long as the structure functions to contain and direct the pure halogen gas generally downwardly at a rate equal to the recycled gas rate through the perforated plate 16 over the atomizer 21. It is desired that the infusion of fresh halogen gas occurs over the atomizer 21 to ensure optimal halogen absorption and reaction with the alkali metal hydroxide droplets. The scope of the appended claims is intended to encompass all obvious changes in the details, materials, and arrangement of parts which will occur to one of skill in the art upon a reading of the disclosure.

What is claimed is:

1. A reactor for the production of a hypohalogenated acid and a solid by-product alkali metal halide salt from the mixing and reaction of an alkali metal hydroxide and a gaseous halogen comprising in combination:
    a. an elongated, generally vertically extending reactor vessel having a top and an opposing bottom, and a central axis therebetween;
    b. gas recirculation means connected to an inlet at the top of the reaction vessel to recirculate at least gaseous halogen back into the top of the reactor;
    c. a halogen infeed line connected to the reactor vessel below the gas recirculation means inlet to supply fresh gaseous halogen in a generally downwardly flow direction to the reactor.
    d. a halogen infeed injector connected to the halogen infeed line, the infeed injector being open-bottomed to contain and direct the fresh gaseous halogen generally downwardly upon exit from the halogen infeed line;
    e. flow directing means for creating a straight flow path for the recirculated gaseous halogen and the fresh gaseous halogen infeed beneath the gas recirculation means inlet connected to and inside the vessel and in flow communication with the gaseous halogen infeed injector effective to direct the gaseous halogen from the top to the opposing bottom;
    f. infeed means mounted to the reactor vessel below the flow directing means and beneath the halogen infeed injector for spraying alkali metal hydroxide droplets into the vessel;
    g. a spraying and reaction zone beneath the infeed means into which the alkali metal hydroxide is sprayed and reacts with a gaseous halogen to form reaction products including hypohalogenated acid;
    h. a drying zone beneath the spraying and reaction zone to dry the reaction products; and
    i. outlet means below the drying zone for outletting gaseous halogen and product from the reactor vessel.

2. The apparatus according to claim 1 wherein the reactor vessel bottom is generally conically shaped.

3. The apparatus according to claim 1 wherein the reactor vessel further has an outlet in the bottom to remove the solid reaction by-product alkali metal halide salt.

4. The apparatus according to claim 2 wherein the infeed means is mounted along the central axis of the vessel.

5. The apparatus according to claim 4 wherein the infeed means is further located below the flow directing means.

6. The apparatus according to claim 5 wherein the infeed means is further a single fluid pressure atomizer.

7. The apparatus according to claim 5 wherein the infeed means is a rotary atomizer.

8. The apparatus according to claim 5 wherein the infeed means is a two fluid nozzle atomizer.

9. The apparatus according to claim 5 wherein the reactor vessel is generally cylindrical above the reactor vessel bottom.

10. The apparatus according to claim 9 wherein the reactor vessel has a predetermined length and a predetermined diameter and the ratio of the reactor vessel length to the diameter ranges from about 1.0 to about 5.0

11. The apparatus according to claim 5 wherein the reactor vessel is generally polygonal above the vessel bottom.

12. The apparatus according to claim 5 wherein the flow directing means is a perforated plate.

13. The apparatus according to claim 12 wherein the perforated plate is generally circular.

14. The apparatus according to claim 5 wherein the gas recirculation means further includes heater means to heat the recirculated gaseous halogen.

15. The apparatus according to claim 14 wherein the alkali metal hydroxide feed line extends generally horizontally into the reactor below the halogen infeed line.

16. The apparatus according to claim 5 wherein the outlet means further extends generally horizontally from about the central axis of the reactor vessel through the reactor vessel and connects to the gas recirculation means.

17. The apparatus according to claim 16 wherein the outlet means further has an undercut ellipsoidally shaped inlet such that the top of the inlet overhangs the bottom of the inlet.

* * * * *

UNITED STATES PATENT AND TRADEMARK OFFICE
CERTIFICATE OF CORRECTION

PATENT NO. : 5,213,771

DATED : May 25, 1993

INVENTOR(S) : Garland E. Hilliard. et al.

It is certified that error appears in the above-indentified patent and that said Letters Patent is hereby corrected as shown below:

The title page showing the illustrative figure should be deleted to be replaced with the attached title page.

Signed and Sealed this

Nineteenth Day of April, 1994

Attest:

BRUCE LEHMAN

*Attesting Officer*   *Commissioner of Patents and Trademarks*

United States Patent [19]

Hilliard et al.

[11] Patent Number: 5,213,771

[45] Date of Patent: May 25, 1993

[54] GAS INJECTOR FOR HYPOCHLOROUS ACID REACTOR

[75] Inventors: Garland E. Hilliard; James K. Melton; John Shaffer, all of Cleveland, Tenn.

[73] Assignee: Olin Corporation, Cheshire, Conn.

[21] Appl. No.: 264,934

[22] Filed: Oct. 31, 1988

[51] Int. Cl.⁵ .............................................. B01F 3/04
[52] U.S. Cl. ................................ 422/224; 422/228; 422/232; 422/234; 159/4.01; 159/4.2
[58] Field of Search ............... 422/224, 228, 232, 234; 159/4.01, 4.02, 4.2

[56] References Cited

U.S. PATENT DOCUMENTS

| | | |
|---|---|---|
| 1,403,993 | 1/1922 | Wallace et al. |
| 1,748,897 | 2/1930 | Oppe |
| 1,897,729 | 2/1933 | Mac Lachlan ........................ 159/4.2 |
| 2,240,342 | 4/1941 | Muskat et al. .......................... 23/152 |
| 3,113,062 | 12/1963 | Darnell ................................... 159/4.2 |
| 3,578,400 | 5/1971 | Wojtowicz et al. ..................... 23/152 |
| 3,706,599 | 12/1972 | Woodruff et al. ..................... 159/4.2 |
| 3,885,918 | 5/1975 | Isahaya ................................... 422/224 |
| 4,146,578 | 3/1979 | Brennan et al. ....................... 423/473 |
| 4,147,761 | 4/1979 | Wojtowicz et al. ................... 423/473 |
| 4,187,617 | 2/1980 | Becker, Jr. et al. ................... 159/4.02 |
| 4,584,000 | 4/1986 | Guest ..................................... 159/4.2 |

FOREIGN PATENT DOCUMENTS 755950 8/1956 United Kingdom ............. 159/4.02

Primary Examiner—Lynn M. Kummert
Attorney, Agent, or Firm—Ralph D'Alessandro

[57] ABSTRACT

An elongated, generally vertically extending cocurrent reactor vessel for the production of hypochlorous acid by the mixing and reaction of a liquid alkali metal hydroxide and a gaseous halogen is provided wherein a nozzle is mounted near the top of the reactor vessel beneath the gas injector to spray the liquid alkali metal hydroxide in droplets so that the halogen gas can be absorbed into the surface of the droplets simultaneously with water evaporation in the vessel. The vessel has a spraying and reaction zone immediately beneath the atomizer and a drying zone beneath the spraying and reaction zone.

17 Claims, 1 Drawing Sheet

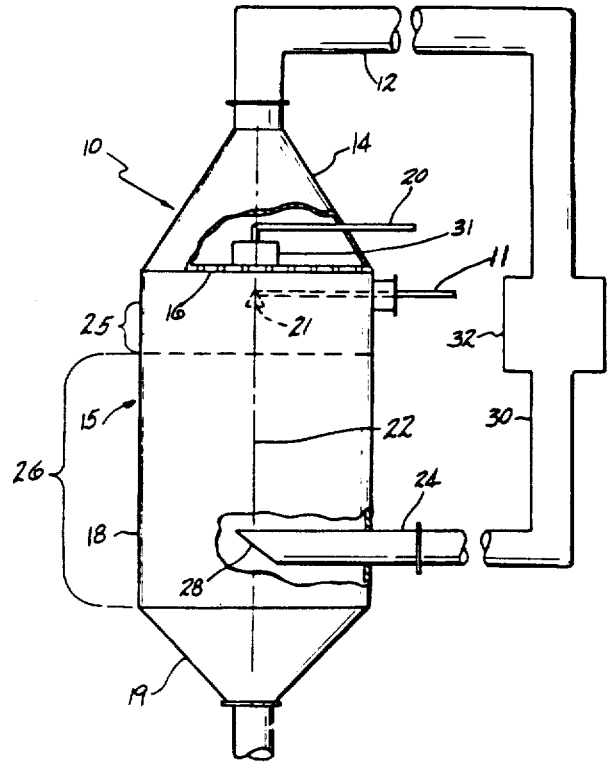

UNITED STATES PATENT AND TRADEMARK OFFICE
CERTIFICATE OF CORRECTION

PATENT NO. : 5,213,771
DATED : May 25, 1993
INVENTOR(S) : Garland E. Hilliard; James K. Melton; John H. Shaffer It is certified that error appears in the above-identified patent and that said Letters Patent is hereby corrected as shown below:

In the drawings, Figure 1 should appear as follows:

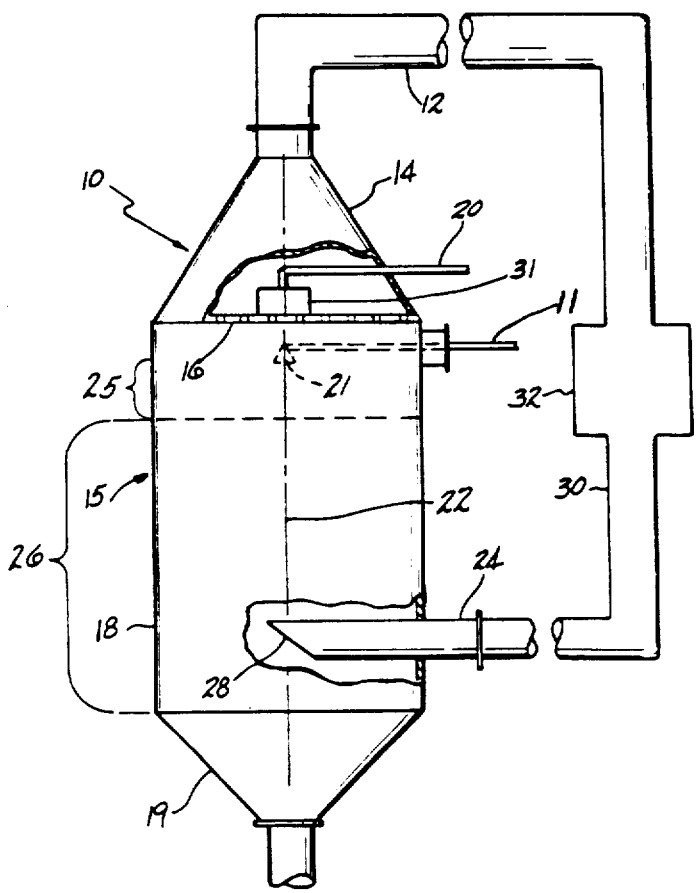

FIG-1